US011490316B2

(12) United States Patent
Palmer et al.

(10) Patent No.: US 11,490,316 B2
(45) Date of Patent: *Nov. 1, 2022

(54) PREDICTIVE ROUTING BASED ON MICROLOCATION

(71) Applicant: Apple Inc., Cupertino, CA (US)

(72) Inventors: Alexander D. Palmer, San Jose, CA (US); Jahshan A. Bhatti, Campbell, CA (US); Joao Pedro Lacerda, Santa Cruz, CA (US); John L. Blatz, San Francisco, CA (US); Joseph E. Meyer, Bethesda, MD (US); Adam A. Sonnanstine, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/180,558

(22) Filed: Feb. 19, 2021

(65) Prior Publication Data
US 2021/0235361 A1    Jul. 29, 2021

Related U.S. Application Data

(63) Continuation of application No. 16/553,009, filed on Aug. 27, 2019, now Pat. No. 10,945,190.
(Continued)

(51) Int. Cl.
*H04W 24/00* (2009.01)
*H04W 40/20* (2009.01)
(Continued)

(52) U.S. Cl.
CPC ...... *H04W 40/20* (2013.01); *H04N 21/25841* (2013.01); *H04W 4/029* (2018.02); *H04W 40/246* (2013.01); *H04W 64/003* (2013.01)

(58) Field of Classification Search
CPC ..... H04W 24/00; H04W 24/08; H04W 64/00; H04W 4/02; H04W 4/028; H04W 4/025; H04W 4/021
(Continued)

(56) References Cited

U.S. PATENT DOCUMENTS 6,323,807 B1    11/2001    Golding et al.
6,990,528 B1    1/2006    Neal et al.
(Continued)

FOREIGN PATENT DOCUMENTS

AU    2013272113    6/2016
AU    2016382952    11/2018
(Continued)

OTHER PUBLICATIONS

U.S. Appl. No. 16/553,009, Non-Final Office Action dated Jun. 15, 2020, 9 pages.
(Continued)

*Primary Examiner* — Temica M Beamer
(74) *Attorney, Agent, or Firm* — Kilpatrick, Townsend and Stockton LLP

(57) ABSTRACT

Techniques are disclosed for predictive media streaming using microlocation. Microlocations of a mobile device can be determined by measuring one or more sensor values at one or more times, the one or more sensor values are determined from one or more signals emitted by a corresponding one or more signal sources. Streaming events can be stored at the mobile device. Each streaming event may include a destination device for playing media and a cluster location, the cluster location corresponding to sensor values that are spatially near each other. A selection of a media item is detected and one or more current sensor values are measured. A current cluster location can be identified using the one or more current sensor value. The current cluster
(Continued)

location and the streaming events can identify a particular destination device for playing the selected media item.

20 Claims, 7 Drawing Sheets

Related U.S. Application Data

(60) Provisional application No. 62/788,630, filed on Jan. 4, 2019.

(51) Int. Cl.
*H04W 40/24* (2009.01)
*H04N 21/258* (2011.01)
*H04W 4/029* (2018.01)
*H04W 64/00* (2009.01)

(58) Field of Classification Search
USPC ................................ 455/456.1, 456.5, 67.11
See application file for complete search history.

(56) References Cited

U.S. PATENT DOCUMENTS

| | | |
|---|---|---|
| 6,992,625 B1 | 1/2006 | Krumm et al. |
| 7,406,116 B2 | 7/2008 | Agrawala et al. |
| 7,979,426 B2 | 7/2011 | Jeong et al. |
| 8,385,943 B1 | 2/2013 | Han et al. |
| 8,412,237 B1 | 4/2013 | Ohme |
| 8,428,754 B2 | 4/2013 | Wong |
| 8,620,624 B2 | 12/2013 | Skibiski et al. |
| 8,666,373 B2 | 3/2014 | Dessouky et al. |
| 8,719,198 B2 | 5/2014 | Zheng et al. |
| 8,774,831 B2 | 7/2014 | Ziskind et al. |
| 8,958,820 B2 | 2/2015 | Weiss |
| 9,084,003 B1 | 7/2015 | Sanio et al. |
| 9,113,300 B2 | 8/2015 | Marti et al. |
| 9,253,605 B2 | 2/2016 | Alizadeh-Shabdiz et al. |
| 9,274,512 B1 | 3/2016 | Zima |
| 9,824,568 B2 | 11/2017 | Hall et al. |
| 10,091,303 B1 | 10/2018 | Ledvina et al. |
| 10,117,046 B2 | 10/2018 | Ledvina et al. |
| 10,200,810 B2 | 2/2019 | Ledvina et al. |
| 10,244,360 B2 | 3/2019 | Bhatti et al. |
| 10,388,135 B1 | 8/2019 | Jordan, II et al. |
| 2006/0075067 A1 | 4/2006 | Blackmore et al. |
| 2006/0087425 A1 | 4/2006 | Haeberlen et al. |
| 2008/0263024 A1 | 10/2008 | Landschaft et al. |
| 2009/0222564 A1 | 9/2009 | Freimuth et al. |
| 2011/0066682 A1 | 3/2011 | Aldunate et al. |
| 2013/0122935 A1 | 5/2013 | Das et al. |
| 2013/0208952 A1 | 8/2013 | Auchinleck |
| 2013/0252637 A1 | 9/2013 | Cha et al. |
| 2013/0300607 A1 | 11/2013 | Mansour |
| 2013/0316734 A1 | 11/2013 | Weiss |
| 2013/0325856 A1 | 12/2013 | Soto Matamala et al. |
| 2013/0331087 A1 | 12/2013 | Shoemaker et al. |
| 2014/0106773 A1 | 4/2014 | Li |
| 2014/0171114 A1 | 6/2014 | Marti et al. |
| 2014/0213298 A1 | 7/2014 | Marti et al. |
| 2015/0026329 A1 | 1/2015 | Apte et al. |
| 2015/0035084 A1 | 2/2015 | Li et al. |
| 2015/0094825 A1 | 4/2015 | Kinoshita et al. |
| 2015/0350841 A1 | 12/2015 | Dal Santo et al. |
| 2016/0029176 A1 | 1/2016 | Marti et al. |
| 2016/0057569 A1 | 2/2016 | Soto Matamala et al. |
| 2016/0165566 A1 | 6/2016 | Jung |
| 2016/0202677 A1 | 7/2016 | Trundle et al. |
| 2016/0232167 A1 | 8/2016 | Ham et al. |
| 2017/0006430 A1 | 1/2017 | Chao et al. |
| 2017/0026987 A1 | 1/2017 | Velu |
| 2017/0124478 A1 | 5/2017 | Baradaran et al. |
| 2017/0272181 A1 | 9/2017 | Gudi et al. |
| 2017/0359679 A1 | 12/2017 | Ledvina et al. |
| 2017/0359680 A1 | 12/2017 | Ledvina et al. |
| 2017/0359697 A1 | 12/2017 | Bhatti et al. |
| 2019/0188766 A1 | 6/2019 | Cho et al. |

FOREIGN PATENT DOCUMENTS

| | | |
|---|---|---|
| AU | 2018101666 | 11/2018 |
| CN | 102404680 | 4/2012 |
| CN | 103814599 | 5/2014 |
| CN | 103995716 | 8/2014 |
| CN | 104541527 | 4/2015 |
| CN | 104782222 | 7/2015 |
| CN | 105045610 | 11/2015 |
| CN | 105393141 | 3/2016 |
| EP | 2 905 967 | 8/2015 |
| EP | 2905967 | 8/2015 |
| KR | 20130107122 | 10/2013 |
| WO | 2013147725 | 10/2013 |
| WO | 2013184383 | 12/2013 |
| WO | 2016083937 | 6/2016 |

OTHER PUBLICATIONS

Australian Application No. AU2017284946, First Examination Report dated Jul. 16, 2019, 3 pages.
Australian Application No. AU2018101666, First Examination Report dated Mar. 5, 2019, 6 pages.
Australian Application No. AU2018250412, First Examination Report dated May 20, 2019, 2 pages.
Bhatti et al., Characterizing MicroLocation Clustering Performance mailed on Jan. 11, 2016, 3 pages.
Do et al., Where and What: Using Smartphones to Predict Next Locations and Applications in Daily Life, Pervasive and Mobile Computing, vol. 12, Jun. 2014, pp. 79-91.
Kaemarungsi et al., Modeling of Indoor Positioning Systems Based on Location Fingerprinting, IEEE Infocom, vol. 2, 2004, pp. 1012-1022.
Kushki et al., Kernel-Based Positioning in Wireless Local Area Networks, IEEE Transactions on Mobile Computing, vol. 6, No. 6, Jun. 2007, pp. 689-705.
Liu et al., Survey of Wireless Indoor Positioning Techniques and Systems, IEEE Transactions on Systems, Man, and Cybernetics, Part C: Applications and Reviews, vol. 37, No. 6, Nov. 2007, pp. 1067-1080.
International Application No. PCT/US2020/012212, International Search Report and Written Opinion dated Mar. 23, 2020, 13 pages.
Xu et al., Preference, Context and Communities: A Multi-Faceted Approach to Predicting Smartphone App Usage Patterns, Proceedings of the 17th Annual International Symposium on International Symposium on Wearable Computers, ISWC'13, Sep. 9-12, 2013, pp. 69-76.
Notice of Allowance, dated Nov. 2, 2020 in U.S. Appl. No. 16/553,009. 11 pages.
"International Preliminary Report on Patentability," dated Jul. 15, 2021 in International Application No. PCT/US2020/012212. 9 days.
"First Action Interview Pilot Program Pre-Interview Communication," dated Oct. 29, 2021 in U.S. Appl. No. 16/892,207. 16 pages.
Final Office Action issued in U.S. Appl. No. 16/892,207, dated Jul. 12, 2022 in 16 pages.

PREDICTIVE ROUTING BASED ON MICROLOCATION

CROSS-REFERENCES TO RELATED APPLICATIONS

This application is a continuation of U.S. patent application Ser. No. 16/553,009, filed Aug. 27, 2019, entitled "PREDICTIVE ROUTING BASED ON MICROLOCATION," which claims the benefit of U.S. Provisional Application No. 62/788,630, filed Jan. 4, 2019, entitled "PREDICTIVE ROUTING BASED ON MICROLOCATION." The disclosure of these applications is incorporated by reference herein in their entirety.

BACKGROUND

Modern mobile devices (e.g., smartphones, laptops, etc.) may contain many applications, each of which designed to perform one or more specific functions. For example, an application may be designed to play media (e.g., music, video, etc.), control the operation of a remote device (such as a television or speaker), manage connections with other users, etc. The number of applications that are stored and operate on mobile devices is increasing. For example, it may not be uncommon for mobile devices to store hundreds of applications ready for operation. While storing numerous applications may allow a mobile device to be particularly useful to the user, it may be difficult and time consuming for the user to identify and execute a particular intended application or function among all of the available applications stored on the mobile device.

Some mobile devices are capable of connecting to a remote device (e.g., television, etc.) and streaming media to the remote device. As many users have multiple devices capable of playing various types of media (e.g., televisions, stereos, speakers, etc.) within a residence. A user may operate a mobile device to stream media to a variety of such remote devices regularly. However, identifying and connecting to a particular desired remote device to stream media can be a difficult, error prone, and time consuming process. It may be difficult to identify the correct remote device as many devices lack user recognizable identification or use generic identifiers that may be confused for other devices. Users may frequently connect to a number of incorrect devices through a trial-and-error process to identify the correct remote device.

Thus, improvements to determining a particular remote device to initiate a media stream is desired.

BRIEF SUMMARY

Aspects of the present disclosure include routing streaming data on a mobile device. One or more sensor values can be measured from one or more signals emitted by one or more signal sources. The one or more sensor values define a cluster location that includes sensors values that are spatially near each other. Streaming events can be stored at the mobile device. A streaming event can include a destination device and a cluster location associated with streaming media. A selection of a media item may be detected causing one or more current sensor values to be measured. A current cluster location can be identified using the one or more current sensor values. A particular destination device for playing the selected media item can be determined based on the stored streaming events and the current cluster location.

Another aspects of the present disclosure include a system including one or more processors and a non-transitory computer-readable media that includes instructions that when executed by the one or more processors, cause the one or more processors to perform the methods described above.

Another aspects of the present disclosure include a non-transitory computer-readable media that includes instructions that when executed by one or more processors, cause the one or more processors to perform the methods described above.

A better understanding of the nature and advantages of embodiments of the present disclosure may be gained with reference to the following detailed description and the accompanying drawings.

DETAILED DESCRIPTION

Modern mobile devices are operated to perform a number of different functions. Some of those functions may include playing various types of media (e.g., audio, video, etc.) locally (on the mobile device) or streamed to one or more remote devices (e.g., display devices, televisions, stereos, speakers, etc.). Users frequently have a plurality of such remote devices in their homes. Aspects of the present disclosure enable predicting a particular remote device of the plurality of remote devices to which a user intends to route a media stream based on the microlocation of the mobile device and historical usage of the mobile device. In some instances, the media may be automatically routed to the predicated device (as soon as the user requests playback of the media). In other instances, the user may be presented with one or more predicted remote devices and prompted to select a particular remote device. In still yet other instances, a shortcut may be generated on the mobile device allowing the mobile device to predict media that a user will want to play, predict a remote device that the user intends to receive the predicted media, and automatically connect to the remote device and initiate streaming of the predicted media to the remote device. In some instances, the predicted destination device for routing the media stream may be the local device.

I. Routing of Media Streams to Devices

Figure 1:
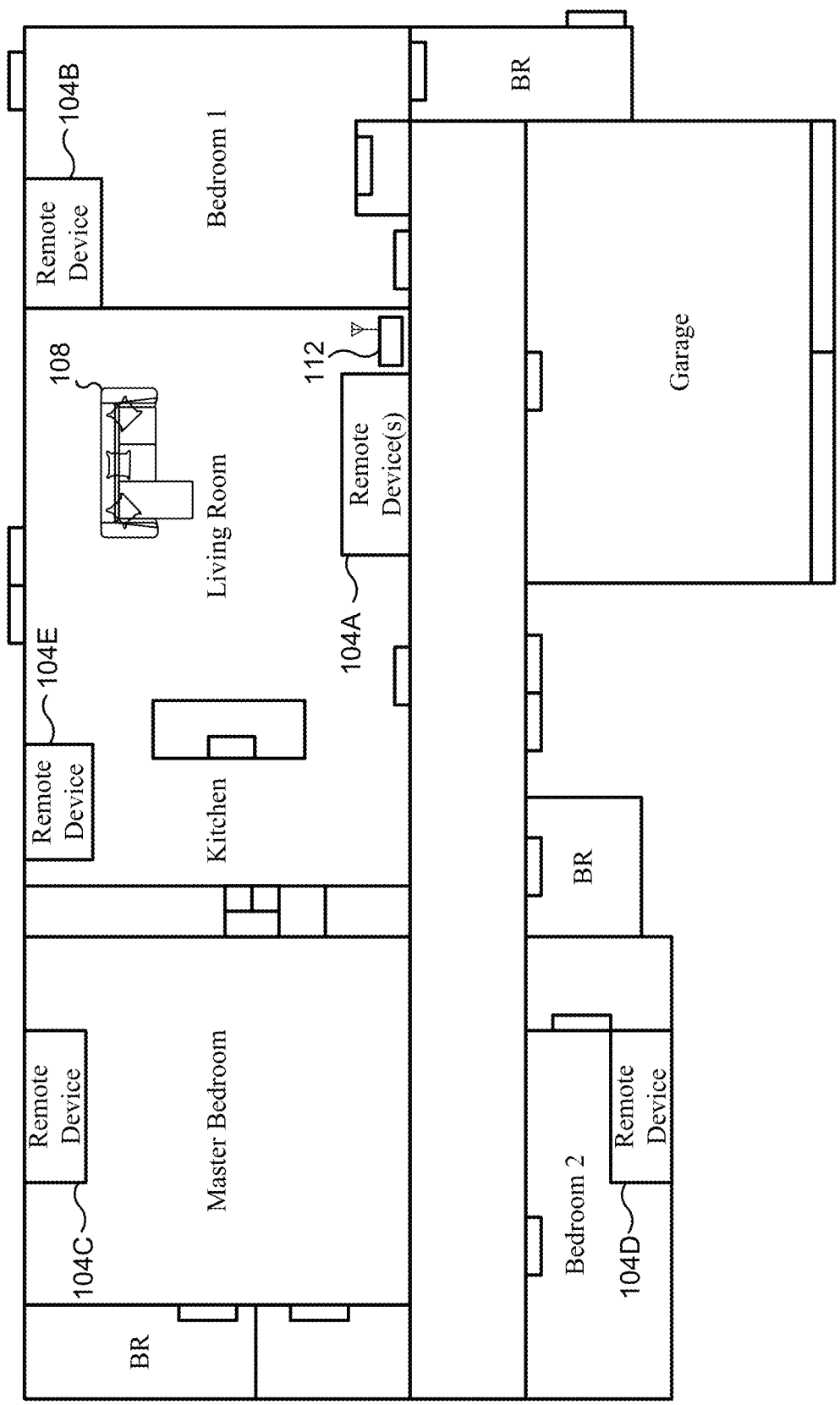
FIG. 1 illustrates and exemplary floorplan of a residence in which predictive routing of a media stream may be used according to aspects of the present disclosure.

FIG. 1 illustrates and exemplary layout of a residence in which predictive routing of a media stream may be used according to aspects of the present disclosure. Modern homes frequently include multiple disparate types of remote devices 104A-104E configured to play or stream media (e.g., televisions, stereos, Bluetooth devices, speakers, etc.). For instances, a residence may include a television (e.g., 104A) in a living room, another television (e.g., 104E) in the kitchen 104E, and one or more device configured to play media (e.g., computers, stereos, televisions, etc.) 104B-104D in each bedroom. Users may operate more than one remote device within the residence to regularly stream media. For instance, a user may stream a television show using the living room television (e.g. 104A) in the afternoon and continuing streaming using a different a bedroom television (e.g., 104C) in the evening.

Embodiments can define a microlocation as a defined position of the mobile device as measured using sensor values determined relative to one or more fixed signal sources. The microlocations and past routing selections can be used to determine a probable remote device to stream the particular media. In some instances, such as when probability is high (e.g., calculated as greater than 80%), streaming media to the remote device may be automatically initiated by the remote device. For example, if the mobile device always selects the living room television to stream media when the mobile device is located on couch 108 of the living room in the evening, then when the user selects media for streaming on the couch in the evening there may be a high probability that the user will select the living room television. The mobile device may automatically select the living room television.

In other instances, such as when the probability is medium (e.g., calculated between 50% and 80%), a list of probable devices may be presented to the user for selection. For example, if the mobile device has a microlocation near two remote devices (e.g., 104A and 104E) and the mobile device uses each device 50% of the time, the probability of either device being the user's intended device for media streaming may not be high enough to trigger automatic routing of the media stream to a particular remote device. The mobile device may present the user with an graphical user interface option enabling the user to select the particular remote device intended for media streaming. In some instances, only those devices that have a medium probability may be shown to the user to make selection easier (and devices that fall below the medium threshold may be omitted from the list). In other instances, the user may be presented with a third option that once selected, presents all possible remote devices in the residence for selection for media streaming.

The location of the mobile device may be determined using one or more sensors of the mobile device. For example, the mobile device may detect signals emitted from one or more fixed signal sources such as a router 112, a remote device 104A-E, a Bluetooth device, and/or the like). One or more properties (e.g., data packet, signal strength, etc.) of each received signal may be used to provide a relative position of the mobile device to the one or more fixed signal sources (despite not knowing the layout of the structure).

II. Sensor Measurements and Clusters

A microlocation can be a location that is determined relative to one or more fixed locations using one or more sensors of the mobile device. For example, one or more sensor measurements may be used to determine the mobile device's position relative to one or more signal sources despite the mobile device lacking details corresponding to the environment. While the mobile device may not determine a precise geographical location, the device may determine a relative location within a residence or building. In some instances, the microlocation may be correlated with the layout of the residence or building to identify a geographical location (e.g., a position within a particular room of the residence or building). Microlocations include locations within a physical space and/or a sensor space (e.g., indicating the position of the mobile device relative to one or more fixed, but unknown, sources). For example, a microlocation in sensor space may indicate that the mobile device is three feet in a particular direction from a radio signal source (e.g., represented as a vector). While the physical location of the mobile device may be unknown, the relative sensor measurements of multiple signals may be used to define a relative mobile device position within a building.

Sensor measurements can be obtained continuously or in response to a triggering event. For instance, the mobile device may detect a button press (e.g., triggering event) and causes the mobile device to measure signals (e.g., WiFi or Bluetooth, etc.) emitted from one or more signal sources, e.g., electronic devices, such as a wireless router, a WiFi equipped appliance (e.g., set top box, smart home device), or a Bluetooth device. The detected signals may be used to generate a multi-dimensional data point of sensor values in sensor space, where each dimension in sensor space can correspond to a property of a signal emitted from a signal source. The multi-dimensional data point may represent the microlocation of the mobile device in sensor space, where the microlocation corresponds to the physical position of the mobile device in physical space.

Figure 2A:
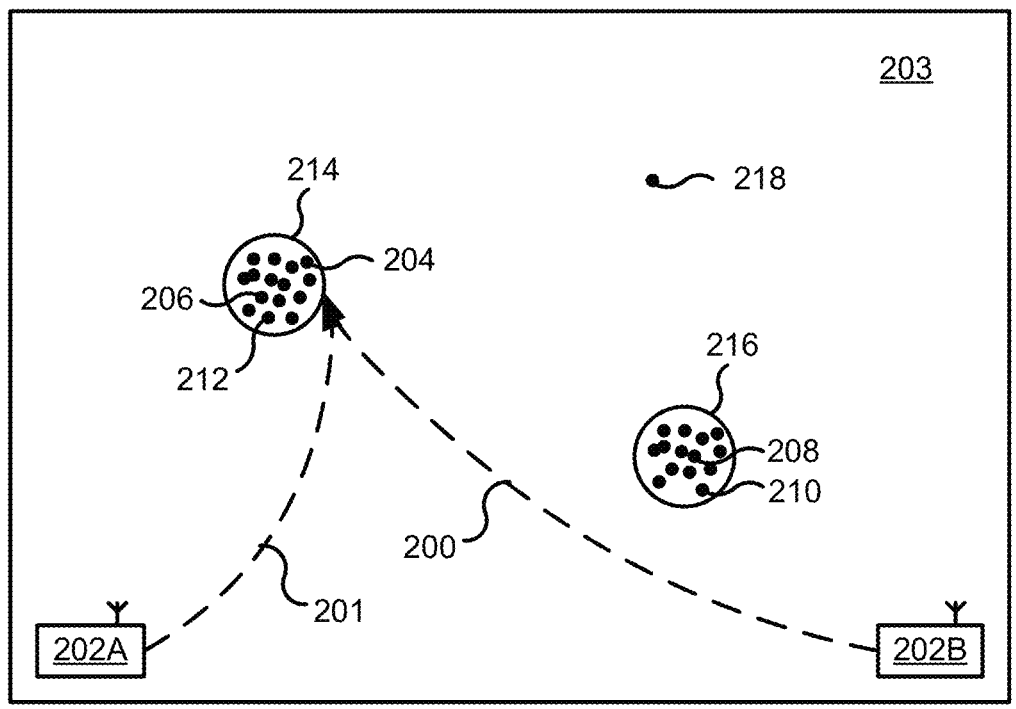
FIG. 2A is a simplified diagram illustrating clusters of physical positions in physical space according to aspects of the present disclosure.

FIG. 2A is a simplified diagram illustrating a plurality of physical positions in physical space 203. As examples, physical space 203 can be the interior of a home, an office, a store, or other building. Physical space 203 may include a plurality of signal sources, such as signal sources 202A and 202B. Each signal source can emit wireless communication signals, as are emitted from a wireless router or a Bluetooth device. A signal source can be considered a stationary device, as their position does not typically change.

A mobile device may be located within physical space 203 such that one or more signals emitted from signal sources 202A and 202B are detected. For example, the mobile device may be located at physical position 204 in FIG. 2A, where signals 201 and 200 are detected from signal sources 202A and 202B, respectively. It is to be appreciated that the mobile device may only measure one of signals 201 and 200 at some positions, e.g., due to signal degradation at certain positions. In some instances, the mobile device may detect signals from external signal sources (not shown) (e.g., outside the physical space 203). While only two signal sources (202A and 202B) are depicted mobile devices may receive (or detect) signals from any number of signal sources (within or external to the physical space).

In many instances, a user may operate a mobile device in some physical locations more often than other physical locations. For example, a user may use a mobile device more often when the user is on a couch than when the user is in the kitchen. These physical locations may be define a cluster location (e.g. a set of one or more physical positions that are spatially near each other), such as clusters 214 and 216 of physical positions. Each cluster may have a group of physical positions that are located close together. As an example, cluster 214 may include physical positions 204, 206, and 212. As shown, cluster 216 includes physical positions 208 and 210. According to embodiments, the mobile device may be configured to determine when the mobile device is in one of these clusters based on the detected signals (e.g., signals 200, 201, and/or other signals not shown). In some instances, the mobile device may use the cluster to predict a particular device in which to stream media.

In other instances, clusters may be used to determine a location of a mobile device with a threshold accuracy. For example, a number of positions of the mobile may be obtained over a predetermined time interval. The quantity of positions and relative proximity of the positions relative to each other may be used to determine the location of the device with a given level of accuracy being based on the quantity of positions and the density of the positions. The greater the quantity of positions detected with a particular density, the greater the probability that that the mobile device's locations is correct. One or more thresholds may be used to determine a particular quantity of positions and the particular density necessary to indicate an accurate location of the mobile device. Thus, clusters may be predefined based on historical data of the mobile device (as described above) to provide a function when the mobile device is located at a predefined cluster and/or clusters may be defined in real-time to define a location of the mobile device with a given level of accuracy.

The mobile device may measure one or more sensor values from signals emitted from signal sources 202A and 202B. For instance, if the mobile device is at physical position 204, the mobile device may measure sensor values from signal 201 emitted from signal source 202A and signal 200 from signal source 202B. The measured sensor values may be signal properties of signal 201 and signal 200. The measured sensor values may be used to define a microlocation in sensor space, as shown in FIG. 2B.

Figure 2B:
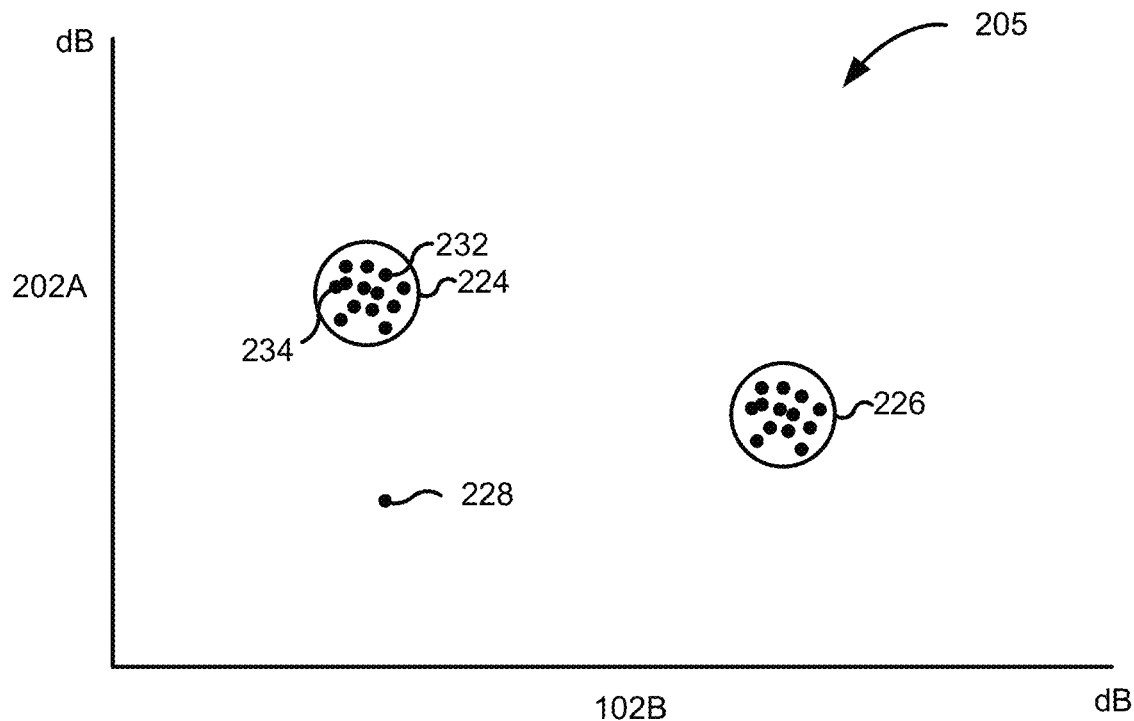
FIG. 2B is a simplified diagram illustrating clusters of sensor positions in sensor space corresponding to the physical positions in physical space of FIG. 1A according to aspects of the present disclosure.

FIG. 2B is a simplified diagram illustrating a plurality of microlocations in sensor space 205, which corresponds to physical space 203. Sensor space 205 is depicted as a plot of measured microlocations in signal strength. The X axis may represent measured values of signals from signal source 202B in dB increasing to the right, and the Y axis may represent measured values of signals from signal source 202A in dB increasing upwards.

The microlocations in sensor space correspond to respective physical positions in physical space 203. For example, measured sensor values at physical position 204 in FIG. 2A corresponds to a microlocation 232 in sensor space shown in FIG. 2B. Microlocation 232 is represented as a two-dimensional data point where one dimension corresponds to a sensor value from signal source 202A and the other dimension corresponds to a sensor value from signal source 202B. Sensor space 205 may include clusters of microlocations, e.g., cluster 224 of microlocations and cluster 226 of microlocations. Clusters 224 and 226 of microlocations correspond with clusters 214 and 216 of physical positions in FIG. 2A, respectively.

Clusters 224 and 226 may be unlabeled locations (e.g., the actual physical coordinates corresponding to clusters 224 and 226 are unknown). It may only be known that there exists a cluster of microlocations that have similar sensor values and that the cluster represents a discrete location in physical space (relative to one or more signals sources). However, the mobile device may perform functions based on microlocations in sensor space such that use of the mobile device in physical space is benefitted. For instance, the mobile device may determine a microlocation of the mobile device and automatically route playback of media to a particular remote device based on whether the microlocation is within a cluster in which pattern of media streaming is known.

Accordingly, a microlocation can correspond to a location that is relative to another (fixed) location. For example, a microlocation may be represented as a vector that includes, for each signal source, a distance from the signal source and a direction. Microlocations may be defined from a set (e.g., one or more) of sensor values measured by sensor(s) of a mobile device while the mobile device is located at a physical position in physical space. A sensor value can be a measure of a property of the signal (e.g., signal strength, time-of-flight, or data conveyed in a wireless signal such a data conveyed by a signal source to the mobile device that includes a property of a signal transmitted from the mobile device to the signal source). Each sensor value of a set of sensors values can correspond to a same or different dimension in sensor space, where the set of one or more sensor values forms a data point (e.g., a multi-dimensional data point, also called a feature vector) in the sensor space.

As shown in FIG. 2A, sensor values for microlocations in cluster 214 may be higher for signal source 202A (which is in the vertical axis in FIG. 2B) than the sensor values for microlocations in cluster 216 (e.g., where the sensor value is signal strength). This may be due to the physical positions in cluster 214 being closer to signal source 202A than physical positions in cluster 216 are to signal source 202A. The differences in sensors values between cluster 214 and 216 may be based on what property the sensor value represents. For instance, for a sensor value that represents a signal property of time-of-flight, the sensor values for cluster 214 would be smaller than the sensor values cluster 216.

A given measurement of one or more wireless signals obtained at a physical position may be made one or more times over a time interval to obtain a set of sensor value(s). Two measurements at two different times can correspond to a same microlocation (e.g., when the two measurements are made at a same physical position at the two different times). A microlocation can have a value of zero for a given dimension. For instance, a microlocation may have a value of zero for a given dimension when a microlocation of a particular wireless signal is not measured, or has a nominal value such as low signal power (−100 dB Received Signals Strength Indication (RSSI)), a large distance between the mobile device and signal source, or uncertainty is too high.

The microlocation or the proximity of a microlocation to a cluster (e.g., cluster location) may be used to form a prediction that that playback of selected media should occur locally (e.g., on the mobile device) or on one or more remote devices. For instance, if playback of selected media occurs in a microlocation that is too far away from a remote device, playback may occur locally. If the microlocation is near only one remote device, then the probability that the user may intend to stream the media to the remote device may be high and the media stream may be automatically initiated. If there are more than one remote devices near the microlocation, then the probably that any one of the remote devices would be the intended destination of the media stream may not be high enough to automatically route the media stream. In that situation, the user may be prompted to select from among the likely remote devices.

While proximity (via microlocation of the mobile device) was the only factor described above, a plurality of factors may be used to determine a probability for each device. For instance, historical steaming activity of the remote device (e.g., remote device previously streamed media from the mobile device, frequency of media streaming, types of media streamed on the device, time since last streaming session, etc.), time of day, location of remote device within a residence or building, type of remote device, user's historical media consumption, and/or the like may be used in addition to the microlocation of the mobile device.

III. Sensor Positions and Sensor Clusters

A mobile device may determine a sensor position within a general location. The sensor position may be a position in space represented by sensor values measured from wireless signals emitted from signal sources. When many sensor positions are recorded, the mobile device may recognize a distribution of sensor positions that form a cluster location (or simply a "cluster") represented by groups of sensor positions that include similar sensor values. The clusters of sensor positions may be used to define a microlocation of the mobile device and predict routing of a media stream to a particular remote device.

Figure 3A:
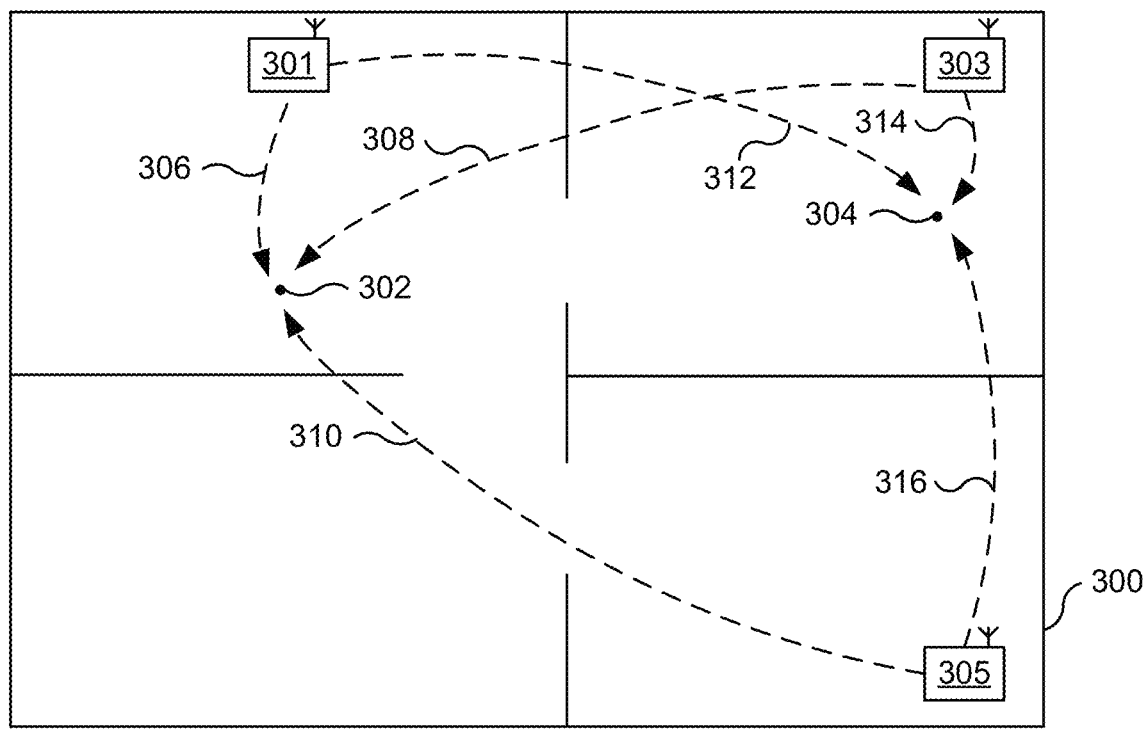
FIG. 3A is a simplified diagram illustrating measurement of sensor positions in a floor plan according to aspects of the present disclosure.

FIG. 3A is a simplified diagram illustrating an exemplary floor plan 300 within which sensor positions are measured. One or more signal sources 301, 303, and 305 may be positioned within floor plan 300. Each signal source may be a device configured to emit wireless signals. For example, a signal source may be an access point such as a wireless router, a Bluetooth device, a computing device (e.g., desktop computer, etc.), or any other device configured to transmit and/or receive signals.

Sensor values measured by the mobile device may be properties of signals emitted from the signal sources. In some instances, the sensor values may be values corresponding to signal strengths of measured signals (e.g., RSSI values) or any other suitable signal property that changes with respect to distance from a signal's point of origin. In other instances, the signal values may be a signal indicative of a distance between the mobile device and the signal's point of origin (e.g., time-of-flight (TOF) measurement values). Exemplary TOF measurements include round trip time (RTT) and one-way ranging measurements. One-way ranging measurements may be performed by synchronizing a clock of the mobile device with a clock of a signal source using IEEE 1588 or its equivalent and then using one-way ranging (e.g., via radio waves such as Wi-Fi, ultra wideband, or radar, or sound waves) to compute a TOF measurement value. In some examples, synchronization may use GPS receivers in each device that are synchronized to GPS time. In other examples, the synchronization may be performed using Wi-Fi waveforms that are not designed for ranging, with Wi-Fi waveforms that are in a different frequency band, with ultra-wide-band (UWB) signals, using atomic clocks that are high quality. In some instances, the synchronization may be at 10 nanoseconds or better.

Although FIG. 3A illustrates floor plan 300 as having only three signal sources 301, 303, and 305, any number of signals sources (e.g., more or less) may exist and/or be used according to aspects of the present invention. Further, signal sources may be positioned in the same room as the mobile device, in a different room from the mobile device, or may be external to the structure). As an example, one or more signal sources may be located in a neighbor's home or office outside of floor plan 300 or in the floor above (or below) floor plan 300. It should be appreciated that signal sources may be located in any position from which wireless signals emitted may be measured by a mobile device according to aspects of the present disclosure.

A. Measurement of Sensor Position

Within floor plan 300, a plurality of sensor positions may be measured by the same mobile device. For instance, as shown in FIG. 3A, sensor values may be measured at a physical position 302 by the mobile device at time T0, while other sensor values may be measured at a physical position 304 by the mobile device at time T1, where T0 does not equal T1. For example, the mobile device may located at physical position 302 in the afternoon when the mobile device is determining its sensor position upon detecting a first triggering event, and the mobile device may be located at physical position 304 in the evening when the mobile device is determining its sensor position upon detecting a second triggering event.

Physical position 302 may be defined by a sensor position containing sensor values measured from signals emitted from signal sources 301, 303, and 305. The sensor values may represent one or more signal properties of the signals emitted from signal sources 301, 303, and 305. As shown in FIG. 3A, physical position 302 may be defined by the properties of signals 306, 308, and 310 measured from signal sources 301, 303, and 305, respectively. Similarly, physical position 304 may be defined by the properties of signals 312, 314, and 316 measured from signal sources 301, 303, and 305, respectively. For example, the sensor values may be an RSSI and/or a TOF (e.g., RTT) of signals emitted from signal sources 301, 303, and 305.

In addition to the sensor values, the mobile device may also receive and record an identification of the signal source. The signal source identification may be any suitable form of identification for the signal source, such as a media access control (MAC) address, internet protocol (IP) address, or the like. The identification of the signal source may be appended to a respective sensor value, such that the mobile device may identify which signal source emitted the measured signal. Other information may also be appended to the measured sensor value. For example, information representing a time interval across which the sensor value was measured, signal payload (e.g., packets), etc. may also be appended to the measured sensor value.

The sensor values may be measured by one or more sensors of the mobile device. Once the signals are measured, the one or more sensors may send the measurements to a sensor position module to generate a sensor position corresponding to physical position 302. The sensor position may be a multi-dimensional data point, which may be represented as a feature vector $x_k$ containing measured signal properties.

For example, a feature vector $x_k$ may be defined as:

$$x_k = \begin{bmatrix} RSSI_k^1 \\ RSSI_k^2 \\ \vdots \\ RSSI_k^M \\ RTT_k^1 \\ RTT_k^2 \\ \vdots \\ RTT_k^N \end{bmatrix}$$

for M number of RSSI values and N number of RTT values, where each integer of M and N corresponds with an identifier of a source signal (e.g., media access control (MAC) address, universally unique identifier (UUID), truncated UUID, Bluetooth device address, or an IP address of an access point) for the associated sensor value, and where k represents a time interval across which the signal value was measured. It should be appreciated that one or more RSSI and RTT values may be measured from the same signal source and thus have the same identifier. Although feature vector $x_k$ includes RSSI and RTT sensor values, a feature vector $x_k$ can include other types of sensor values (in addition to or in place of RSSI and RTT sensor values) for determining a sensor position

B. Creating a Multi-Dimensional Data Point

Sensor values may be measured and stored in a database, such as a sensor position database for use in generating a multi-dimensional data point. In some instances, a filtering step may be performed to avoid storing sensor value measurements that may be distorted or unreliable.

1. Data Measuring

Figure 3B:
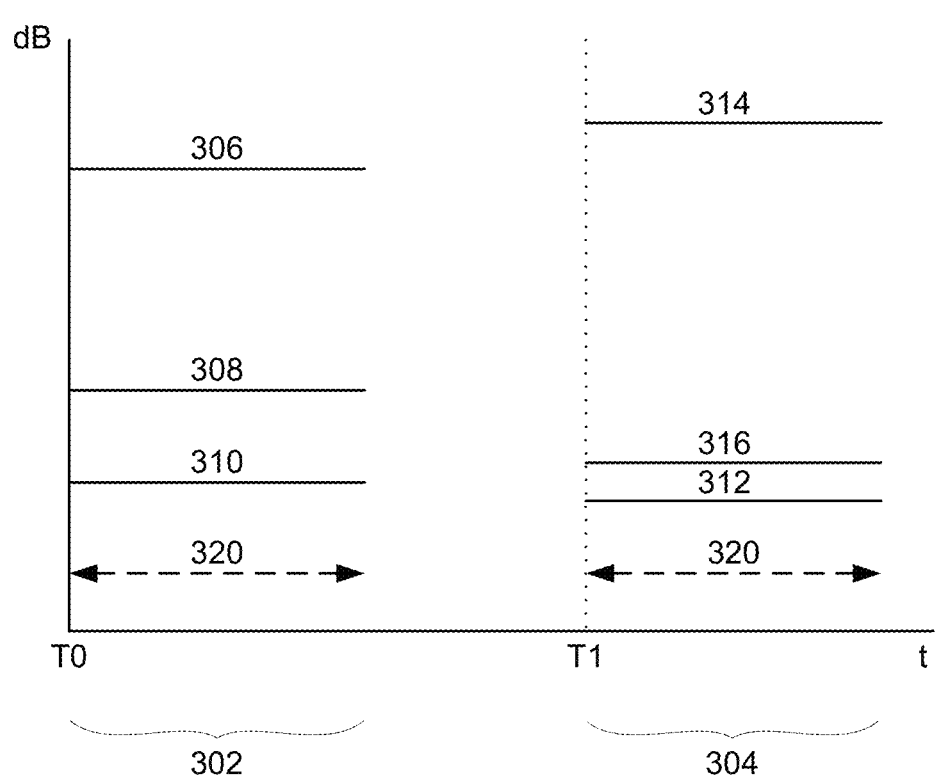
FIG. 3B is a chart representing sensor measurements for determining a sensor position according to aspects of the present disclosure.

Multiple sensor values may be measured across a predetermined time interval to create a multi-dimensional data point. FIG. 3B is a chart illustrating an exemplary measurement of sensor values (e.g., RSSI signal values) at physical positions 302 and 304 at time T0 and T1, respectively, across a time interval 320. The vertical axis may represent signal strength in decibels (dB) and the horizontal axis may represent time (t).

T0 may be an instance in time in which a triggering event is detected that causes the mobile device to measure a current sensor position. At time T0, sensor values may be measured for signals 306, 308, and 310 at physical position 302. The sensor values may be measured for a duration of time (e.g., interval 320). In some embodiments, multiple measurements of signals 306, 308, and 310 may be made across time interval 320. Time interval 320 may be an amount of time that is long enough for the mobile device to accurately measure a sensor value. In some instances, the length of time interval 320 may be based on two factors: measurement accuracy and power consumption (e.g., time interval 320 may be limited to reduce the power drawn from a power source, such as a battery). In some instances, a time interval 320 may be less than one second.

After T0 and after the mobile device has moved to physical position 304, the mobile device may detect another triggering event and begin to measure its sensor position again at time T1. At T1, the mobile device may measure sensor values of signals 312, 314, and 316 from signal sources 301, 303, and 305, respectively, across time interval 320.

As shown in FIG. 3B, some sensor values may have higher dB levels than other signals at each sensor position. This may be because signal strength is inversely proportional to the distance of separation between a sensor and a signal's point of origin (e.g., signal source), meaning shorter distances of separation may result in higher signal strengths. Each sensor position may have its own distinctive arrangement of signal strengths. Furthermore, depending on the location of the mobile device when sensor values are measured, the mobile device may not detect some signals emitted from certain signal sources. Accordingly, each sensor position may include sensor values from a unique set of signal sources. As a result, some sensor positions may have different sensor values, and other sensor positions may have similar sensor values. The similarities and differences in signal strengths and arrangements of signals sources may be analyzed to define clusters of sensor positions that include similar properties.

Measuring sensor values across a predetermined time interval may create a trend of sensor values. For example, each sensor value measured at physical position 302 and physical position 304 may have a substantially horizontal trend of sensor values. A horizontal trend indicates that the mobile device was not substantially moving while measuring sensor values. Horizontal trends may indicate accurate sensor value measurements. A trend of sensor values are not substantially horizontal may indicate that the mobile device has substantially moved during measurement of the sensor values and that the measurements may be inaccurate. Inaccurate measurements may be filtered out. Filtering may occur for other signal properties than the signal strength shown in FIG. 3B, such as TOF measurements.

2. Data Filtering

Figure 4A:
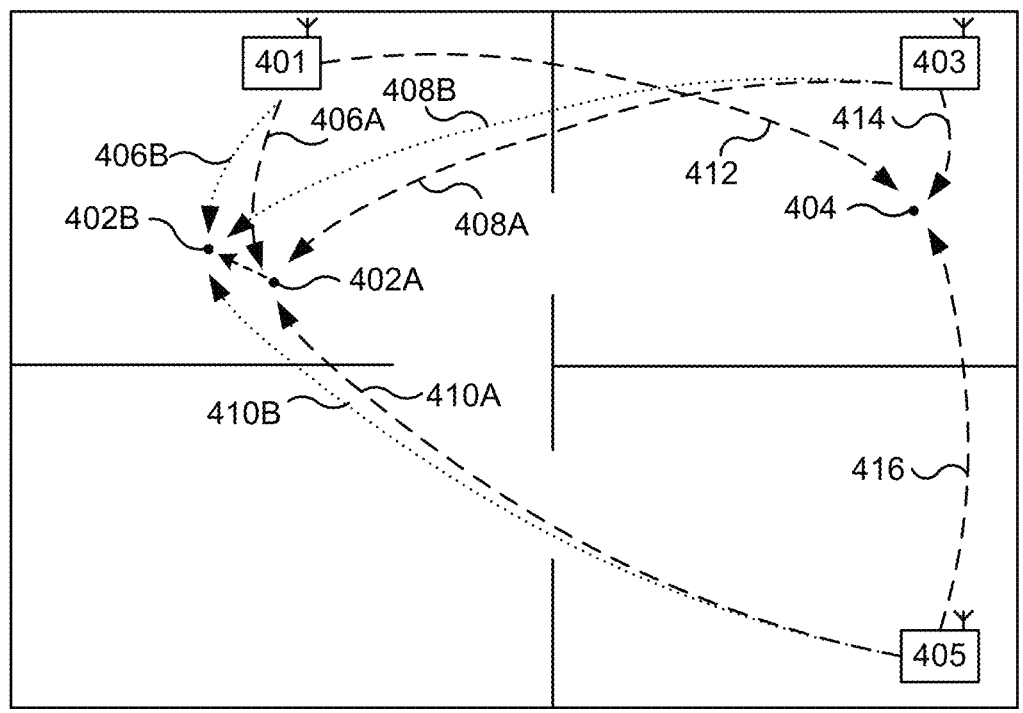
FIG. 4A is a simplified diagram illustrating measurement of sensor values in a floor plan when a device has moved according to aspects of the present disclosure.
Figure 4B:
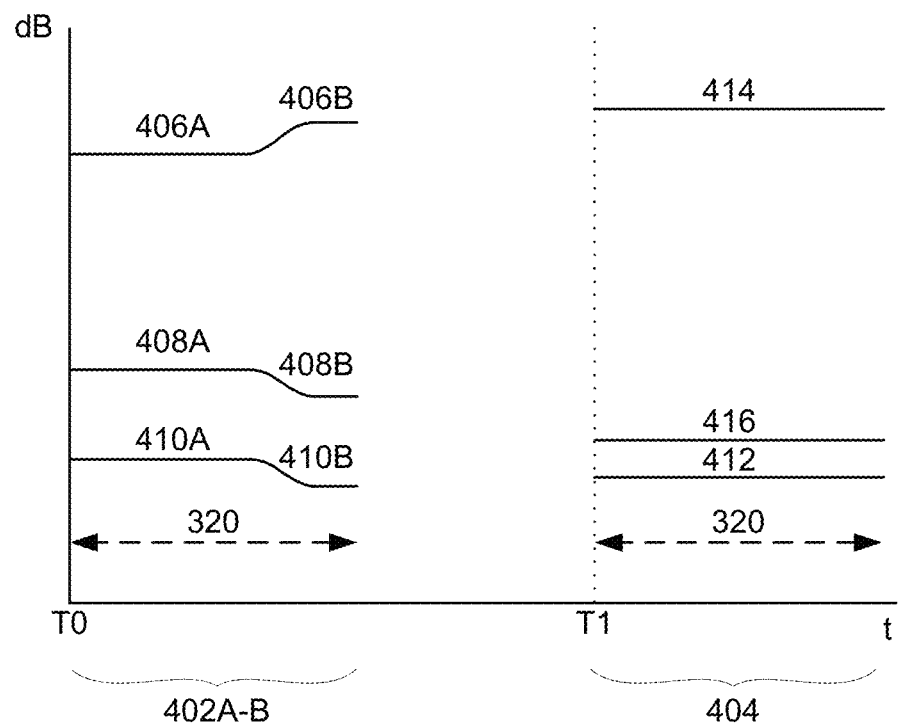
FIG. 4B is a chart representing sensor measurements for determining a sensor position when a device has moved according to aspects of the present disclosure.

FIGS. 4A and 4B illustrate a situation where measurement results in trends of sensor values that are not substantially horizontal. As shown in FIG. 4A, a mobile device may move from physical position 402A to physical position 402B during measurement of sensor values for a time interval corresponding to sensor position. As a result, the trend for each sensor value may increase or decrease as shown in the chart illustrated in FIG. 4B.

At time T0, measured sensor values at physical position 402A may be substantially horizontal for signals 406A, 404A, and 410A from signal sources 401, 403, and 405 until a time at which the mobile device moves to physical position 402B before time interval 320 has expired. After moving to physical position 402B, certain measured sensor values may increase or decrease to measured sensor values of signals 406B, 404B, and 410B. The change in the trend of the sensor values may cause the mobile device to not record the single sensor position that includes the sensor values at 402A and 402B. In some embodiments, a change in measured sensor values greater than a threshold value may be filtered out (e.g., not stored). This is in contrast to sensor values measured of signals 412, 414, and 416 when the mobile device is at physical position 404, where the sensor values are stable. In some embodiments, when the measured sensor values are stable, such values can be compressed (e.g., some values dropped, normalized, weighted, averaged, etc.). Such a process can remove redundant information, thereby limiting storage space and reduce computation due to a sensor space with fewer dimensions.

3. Data Storage

Once the multi-dimensional data point has been generated, the multi-dimensional data point may be stored. As an example, the multi-dimensional data point may be stored in a database. A database may store numerous other multi-dimensional data points generated over a period of time. As an example, a database may store multi-dimensional data points generated from the most recent seven weeks of time. Multi-dimensional data points generated from more or less than seven weeks of time may be stored in other embodiments. The amount of data points may depend on the mobile device's storage, processing time, memory capacity, and/or privacy policy. The multi-dimensional data points stored within the database may be accessed to build a cluster model for predicting applications, as discussed herein.

C. Generating Cluster Model

A cluster model may be generated from the multi-dimensional data points in the database. A process may analyze the multi-dimensional data points and determine whether there are groups of multi-dimensional data points that have similar sensor values. Multi-dimensional data points having similar sensor values may indicate that these multi-dimensional data points are close in proximity to one another.

Multi-dimensional data points may be determined to be similar to one another when they are within a threshold distance of each other. The threshold distance may be a distance in sensor space, meaning a distance represented in units of decibels (dB). In other instances, the threshold distance may be a distance in physical space (e.g., when a mapping function is used to transform sensor distance to physical distance), and thus represented in units of physical distance (e.g., meters).

The units of the threshold distance may be dependent upon the units of the measured sensor positions. For instance, if the sensor position is in units of dB or meters, then the threshold distance may also be represented in units of dB or meters, respectively. For example, typical values for the threshold distance in sensor space may range between 6-10 dB. If the sensor position is in units of dB and meters (e.g., when some measured values are from RSSI measurements and some are from TOF measurements), then two threshold distances may be respectively used in units of dB and meters. Thus, the sensor position can be broken up into two separate measurements, one in dB and one in meters, thereby effectively providing two positions, both of which can be required to satisfy their respective threshold distance. In other instances, each distance along one dimension can be determined as a unit-less quantity by normalization, (e.g., using a maximum value for that dimension). The separate sensor value for dB and meters can be combined into a single distance value that can be compared to a single threshold distance.

In some instances, the threshold distance may be selected based upon the correlation between measured values and physical distances. Having a correlation between measured values and physical distances may allow the mobile device to accurately determine the location of multi-dimensional data points for determining relative distances.

IV. Predictive Media Routing

Figure 5:
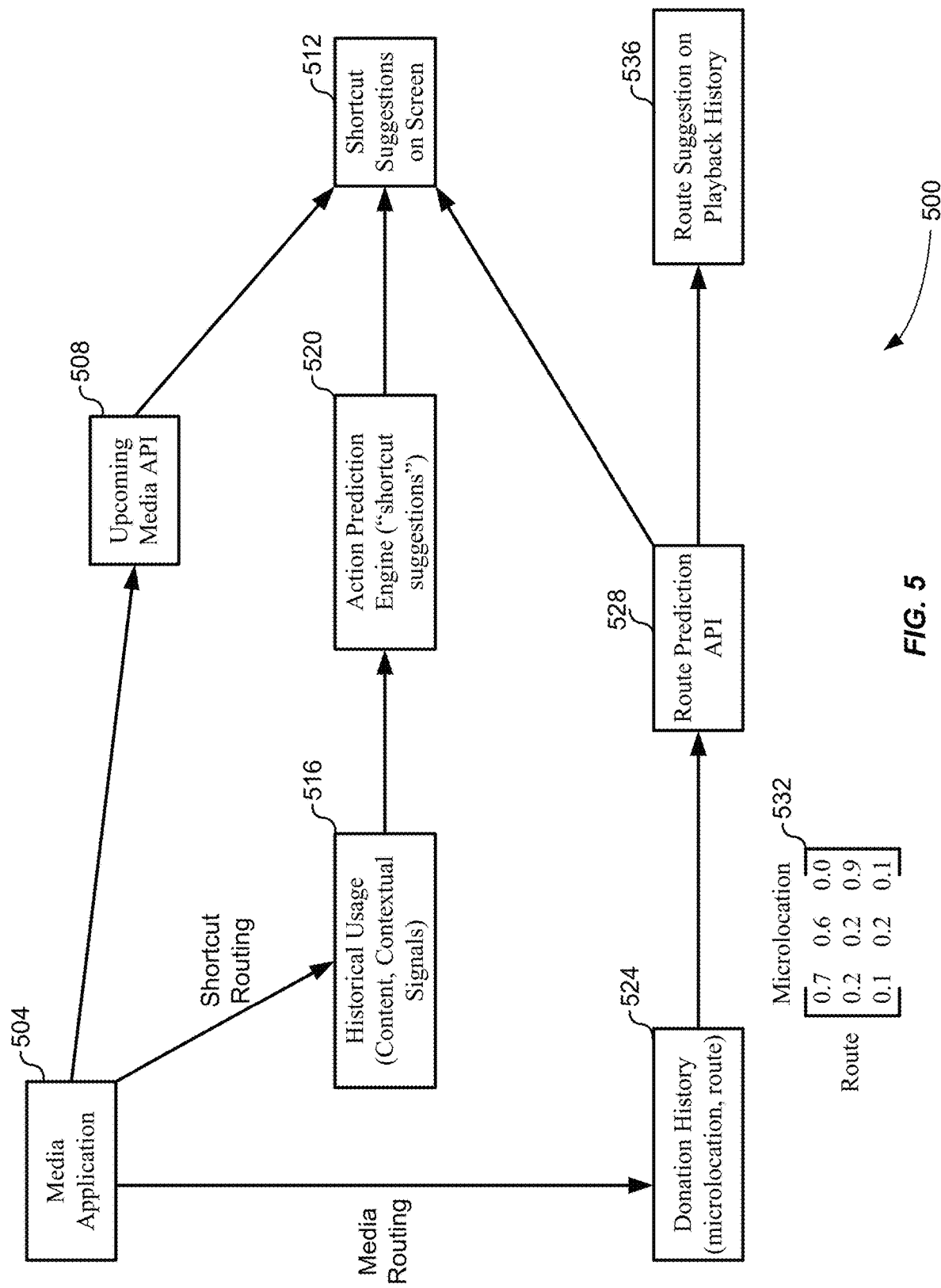
FIG. 5 is a block diagram of modules and processes for predicting media configured to be played on one or more devices according to aspects of the present disclosure.

FIG. 5 is a block diagram of modules and processes for predicting media configured to be played on one or more devices. The block diagram describes various modules and processes that use historical media application usage and historical routing to generate prediction of media items and/or routes. For example, loading a media application may trigger a shortcut suggestion, shortcut routing, or media routing. Shortcut suggestion uses historical media application data to generate (automatically or by a user) a shortcut that triggers a media item playback when the media application is loaded. Shortcut routing can may analyze historical media application usage to predict a media item a user may want to watch as well as a route in which to stream the media item. Route prediction predicts a route to watch a selected media item based on historical usage and a microlocation of the mobile device. The modules and processes may trigger upon selection of media (or a media application) to stream media to the appropriate destination device.

At 504, a selection of a media item (e.g., video, music, media application, etc.) is detected. In some instances, the selection of the media item may be performed by the mobile device based on previous selections of media items (e.g., using an Upcoming media API, event stream, etc. described below). In other instances, the selection of a media item may be detected when a user loads a media application stored on the mobile device and configured to play media. The mobile device may store a plurality of media applications each of which configured to play one or more types of media (e.g., video, music, audio, etc.). For example, one media application may play media stored locally on the device while another media application may stream media from one or more remote sources. Any media playable by the device (e.g., locally or streaming) can be streamed to a remote device.

A. Shortcut Suggestion

In some instances, media application 504 may not trigger shortcut or stream based routing. In those instances, the mobile device may generate a function call using Upcoming Media API 508 to access one or more media items queued to play next by the media application. For example, for the video application, the mobile device, using the Upcoming Media API 508, sends a call to the video application. The video application may return an identification of the next episode of a television show recently viewed by the user. Other applications may return other types of media. For example, a music player may return the next track of an album or playlist recently played by the user.

In some instances, Upcoming Media API 508 may be accessed every time a media application loads to play particular media. However, it may not be necessary for Upcoming Media API 508 to access the media queue directly from the media application. For example, the API may obtain the media played, the next queued media to play, the time the media was played, etc. and store the data in local (or remote) memory. Upon loading the media application later, Upcoming Media API 508 may access the stored data rather than obtain the information directly from the media application. Upcoming media API 508 may periodically obtain updated information from the media application when it is loaded or at some other time such as when the media application is not in use by the user.

At block 512, a shortcut suggestion may be displayed on the screen of the mobile device enabling a user to select or ignore a shortcut. A shortcut is a routine of one or more functions that execute according to a predefined rules (e.g., user toggled, at a user defined point in time, at a user defined intervals, upon detecting a user selected event, etc.). For example, a user could create a shortcut that detects a selection to play music, and automatically routes the music to a particular Bluetooth speaker. The shortcut suggestions may be automatically generated based on the historical usage of the particular media application.

The suggested shortcut may be configured to suggest or automatically play the media item identified by the Upcoming Media API 508. Upcoming Media API 508 may identify the next media item each time the shortcut is triggered such that the shortcut does not cause the same media item to be continuously suggested or played. If the user selects the shortcut suggestion then the identified media item may be played and a shortcut may be generated that may play the a subsequently identified media item next time media application is loaded. Otherwise, if the shortcut suggestions is ignored, then the user may select the next media item to play using the media application. The shortcut suggestion may be deleted (or cached for data analysis). If the shortcut is ignored, another shortcut suggestion may be generated next time (or after some time interval) in which the media application is loaded.

B. Shortcut Routing

Shortcuts may also be used to automatically identify and route media to a particular destination device for playback. A destination device may be the mobile device (e.g., local playback) or any remote device configured to receive and play a media stream. Shortcut routing begins after a media application is initiated at 504. At 516, historical usage information can be identified. Historical usage information may be 'donated" from applications operating on the mobile device. A donation may include an event (e.g., a particular media item such as an episode of a television show that was played) and context information (e.g., identifier of the episode, destination device, microlocation of the mobile device, time in which the episode was watched, remaining battery life the mobile device or charging status, user demographics, and/or the like). Each donation (e.g., event and context) may be pushed onto an event stream accessible by a shortcut API for use in defining new shortcuts.

At 520, action prediction engine processes a portion of the event stream to form a shortcut suggestion. The action prediction engine may use a machine-learning model trained using historical events in the event stream. Once trained, the machine-learning model may process the most recent one or more events of the event stream to form predictions. For example, the machine-learning model may perform a logistical regression on events of the event stream to predict the likelihood of a future event given contextual constraints (e.g., time, microlocation, etc.). For example, the machine-learning model may determine a probability that a particular television show will be played at a given time and when the mobile device is located at a particular cluster location.

The machine-learning model may generate a score for one or more events. If the score exceeds a threshold, then the event is likely to reoccur again in the future. The events are stored and used to define shortcuts for the user. If the score does not exceed the threshold, then the event may be ignored. Even events that exceed the threshold may be subject to one or more rules. For example, even if an event is deemed likely to reoccur, but has only occurred once in the past, the event may be ignored. The one or more rules may be based on a minimum number of criteria that must be satisfied for an event to be used for a shortcut.

For example, if a user operates the mobile device every day at 900 PM to watch a particular television show in the user's living room, the machine-learning model may identify the pattern and indicate that the event (e.g., the televisions show will be played) is likely to reoccur at 9:00 PM if the mobile device is located at or near the living room microlocation. The action prediction engine may use the event to define a shortcut that suggests playback of the next episode of the televisions show (based on Upcoming Media API. The shortcut may ask the user if the user wants to initiate the next episode of the television show when the microlocation and time conditions are met. In some instances, the shortcut may cause the next episode to play automatically. In some instances, action prediction engine may additionally predict the destination device likely to be selected by the user to stream the television show (e.g., based on historical usage).

At 512, the generated shortcut is displayed to the user for approval. Upon approval, the suggested media item may be played by the mobile device (e.g., locally or to a remote device if the machine-learning model detects a probable remote device). In addition, the shortcut may trigger next time the triggering event was satisfied (e.g., the media application was loaded, an event is determined to reoccur, and contextual constraints are satisfied). Otherwise, if the suggested shortcut is not approved, the process (504-516-520-512) may be repeated later (e.g., next time the media application is loaded).

C. Airplay Routing

Media played by the mobile device may be automatically routed to a particular destination device based on past streaming usage. At 524, after the user has loaded a media application at 504, the event stream is analyzed along with a route history stream. Every time the mobile device streams content to a remote device (e.g., through Airplay, etc.), the microlocation of the mobile device and the particular remote device that received the stream is recorded as an entry in the route history stream. The event stream may be correlated with the route history stream to identify the likelihood that a given route (e.g., remote device) may be selected based on a given event occurring.

At 528 the route prediction API may be used to determine a route prediction (and confidence score). Route prediction API may use a portion of the route history stream (e.g., a recent one or more routes) to generate a correlation matrix. Route prediction API may use a set of previously used routes to determine a probability that each route out each possible route will be selected as the next route. Each row of the correlation matrix may represent a route (of a plurality of routes). The value of each row may be determined by aggregating a count indicating a frequency in which the route represented by the row is detected in the route history stream and normalizing the aggregated count. Each row of the correlation matrix may indicate a probability for each route. The correlation matrix may represent a route for each destination device (e.g., a route for each remote device and a row for local playback on the mobile device).

Since a user's streaming habits may change over time, using every route in the route history stream may produce inaccurate probabilities. For example, a route recorded in the route history stream a year ago may no longer reflect the viewing habits of the user. Thus, route prediction API may constrain the quantity of routes in the route history stream used to generate the correlation matrix using one or more rules (described below). Further, the accuracy of the correlation matrix may be maintained by frequently generating a new correlation matrix (or updating the values of the current correlation matrix) to use more recent routes. In some instances, the correlation matrix may be generated each time the mobile device streams content to a destination device.

The one or more rules may be used to guide the selection of routes to include in generating the correlation matrix. Some routes may be a higher indication of a user's intention then other routes. For example, if the last three routes in the route history stream are the same then the route is good indicator of that user may intend to use the route again. A route that was used once and a year ago, may not be a good indicator that the user may use the route again. The one or more rules may indicate a minimum or maximum quantity of routes to use to generate the correlation matrix, a weight to apply to each route (e.g., based on an amount of time since the route was used, etc.), which routes to include in generating the correlation matrix, which routes to exclude in generating the correlation matrix, minimum frequency of route occurrence, and/or the like. For example, if a route appears in the route history stream multiple times in a row then the one or more rules may weight that route above other routes. Similarly, if the most recent route appears a predetermined number of times in a row (e.g., two, three, etc.), then the one or more rules may use that route to generate the correlation matrix while omitting routes that are older. The one or more rules may restrict or expand the quantity of events used based on the frequency of events/routes, frequency of types of events, quantity of events/routes in a row, etc.).

In some instances, a mobile device may initiate a streaming session along a particular route. When the mobile device stops streaming, the session may remain active for a predetermined time interval (e.g., couple of hours, days, based on previous media item having not been viewed in full, etc.) despite the mobile device have ceased streaming media. If the mobile device detects selection of a media item (while the session is still active), the one or more rules may include the particular route over other routes (e.g., some or all other routes) as it is likely that the user will intend to resume the streaming session using the same route. In some instances, the local route (e.g., playing the media locally on the mobile device) may remain in the correlation matrix.

The probability of each route being selected in the correlation matrix may be correlated with the microlocation of the mobile device to determine a combined probability that a route will be selected given the microlocation. The microlocation vector of the mobile device can be multiplied by the correlation matrix to identify the combined probability that the mobile device (being located at a particular microlocation) will route media to along a particular route. The output can be a matrix (e.g., matrix 532) that may be used by the route prediction API to determine if route suggestion 536 is to be performed or if shortcut suggestion 512 is to be performed. If the combined probability of the highest probability route is over a first threshold (e.g., 80%), then it is highly probable that the route would be selected by the user given a particular event.

At 536, the high probability route is suggested to the user based on the playback history (e.g., event stream). The route suggestion may indicate for a particular event (e.g., media, media application, type of media item, time, microlocation, and/or other context information) a particular route (e.g., destination device) to play a media item. In some instances, the selected media may be automatically sent along the particular route (e.g., to a particular destination device) based on user input (e.g., user selection or user approval of the route suggestion). In other instances, the route suggestion may automatically (e.g., without user intervention) stream the media item along the highly probability route. An icon or graphic may be displayed to provide an indication to the user that automatic routing has occurred and the destination device that will stream the media. Route suggestion 536 does not provide force future matching events to be streamed along a particular route. Instead, route suggest 536 dynamically determines a suggested route each time media is selected upon detecting a high probability route.

If, at 528, the combined probability of the highest probability route is below the first threshold but above a second threshold (e.g., between 50% to 80%, etc.), then the highest probability route may be considered medium probability. Route suggestion 536 may provide automatic routing for medium probability routes. Instead, the mobile device may prompt the user for a selection (e.g., each of the routes over 50% or a select number of routs over 50%, the highest n routes, etc.). If a user selects a particular route, then the current and future playback of selected media may be streamed along the selected route.

If the combined probability of the highest probability route is below the first and the second thresholds, then a shortcut suggestion 512 process may be executed. The shortcut suggestion may suggest one routes to stream selected media or provide an interface to the user to generate a new shortcut (e.g., the user may select a media item or media application, an action to perform in response to selecting the media item or media application such as automatic playback of a media item or automatic routing to a particular destination device, and contextual constraints).

In some instances, it may be determined if the route is still viable before providing a route suggestion (at 536). For example, even though the event stream and routing history stream indicate the mobile device always streams to the same remote device (e.g., high probability), the remote device may be unplugged by the time route suggestion occurs. Playback may no longer be possible on that route. If the next highest probable route is a high probability route then route suggestion may occur using that route. If the next highest probable route is a medium route, then the mobile device may present a selection of one or more destination devices to the user for selection.

When media is selected (through automatic routing set up from 536 or shortcut routing at 512), an icon or graphic may be displayed to the user via the graphical user interface of the mobile device. The icon or graphic may indicate that a media streaming process is initiated, the media being streamed, and/or the route in which media is being streamed. A user may select the icon or graphic to obtain more information, cancel the media stream, select a different device to route the stream, and/or the like.

V. Predictive Media Routing

Figure 6:
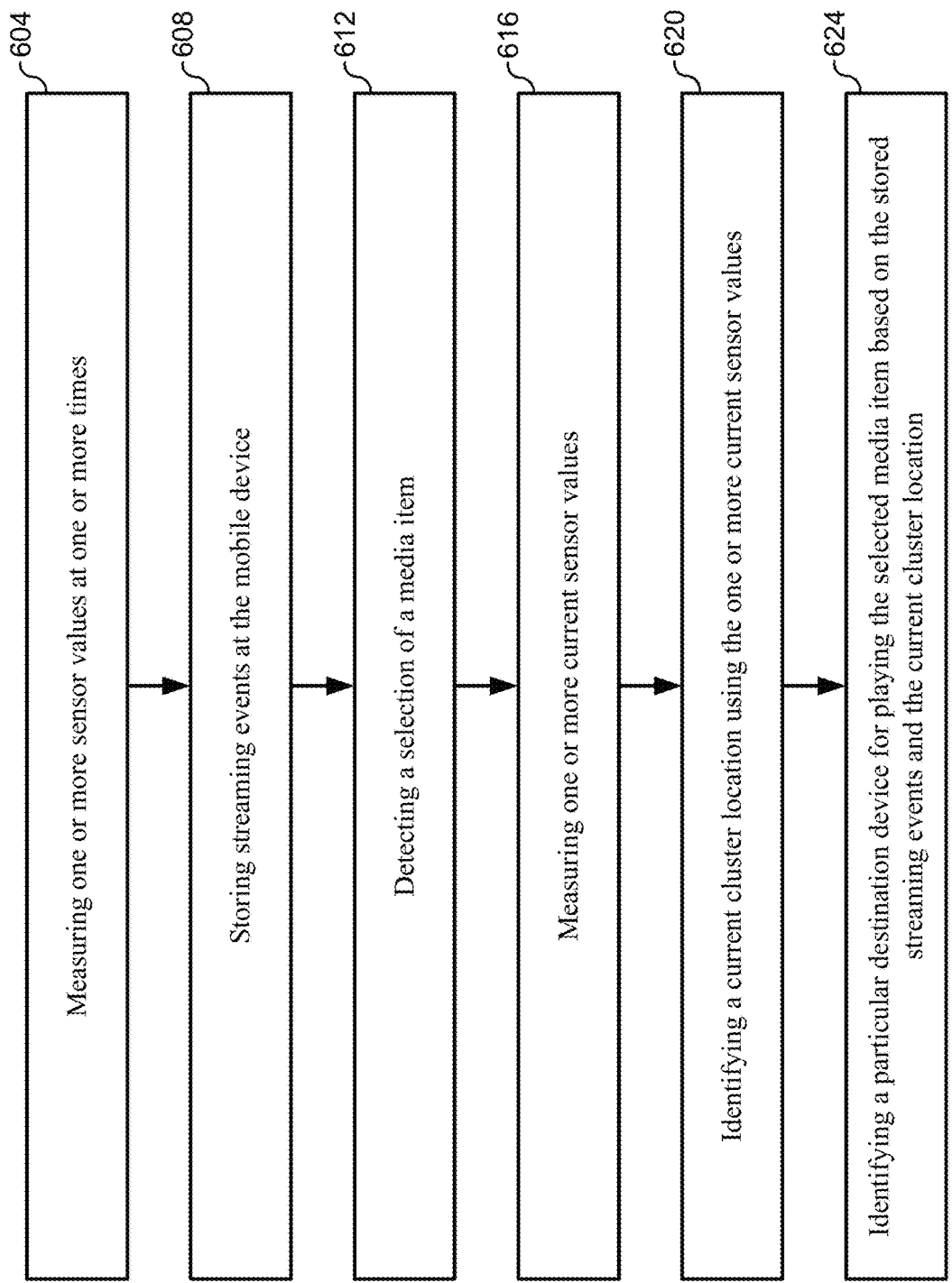
FIG. 6 is a flowchart of a process for routing a media stream based on microlocations according to aspects of the present disclosure.

FIG. 6 illustrates a process for predicting media routing to a particular remote device of a plurality of remote devices.

At 604, a mobile devices measures one or more sensor values at one or more times. One or more sensors of the mobile device may be used to gather the one or more sensor values. For example, the mobile device may use a Bluetooth, cellular, and/or WiFi receiver to detect signals that are generated in or near a structure (residence, office building, etc.) of the mobile device. One or more other sensors may also be used such as, but not limited to accelerometers, compasses, gyrometers, pressure sensors, audio sensors, light sensors, barometers, and/or the like. The one or more sensor values may be obtained over a predetermined time interval (e.g., three seconds, etc.) or once each occurrences of a reoccurring time interval (e.g., every three seconds, etc.). In some instances, the one or more sensor values may be measured upon detection of a particular event (e.g., selection of a particular application, selection of particular media, etc.).

The one or more sensor values may be used to determine a microlocation of the mobile device within the structure. For example, by detecting the signal strength of one or more signals, the mobile device may define a microlocation vector (e.g. distance from the signal source and direction). In some instances, one or more microlocations within a particular proximity to each other may define a cluster location. For example, for a user that operates the mobile device from a couch, one or more microlocations may be detected (e.g., for various locations on the couch from which the mobile device was in operation). Given the proximity of each of the one or more microlocations, a cluster location may be defined. A plurality of cluster locations may be defined within a single area (e.g., each location the user regularly operates the mobile device). In some instances, cluster locations may be updated (e.g., older relative locations may be removed and new relative locations added), added (e.g., based on new user activity, or removed (e.g., if too few relative locations within a cluster location remain).

At 608, streaming events may be stored at the mobile device. Each streaming event may include a destination device that played the media and a cluster location. One of the plurality of destination devices may include the mobile device (e.g., the media was played locally). In some instances, the cluster location may be the cluster location in which the event occurred. In other instances, the cluster location may be the cluster location that is spatially close to a microlocation (e.g., determined from the one or more sensor values) of the mobile device at the time the event occurred.

At 612, a selection of a media item may be detected. The selection may include selection of a file (locally stored on the mobile device), selection of a media application (e.g., Netflix®, etc.), selection of media within a media application (e.g., a television show, film, etc.), and/or the like. The selection of a media item may be automatic (e.g., based on usage history of the mobile device used to predict that the user will likely want to view a particular media item) or by a user.

At 616, one or more current sensor values may be detected. The one or more current sensors may be used to determine a microlocation of the mobile device.

At 620, the one or more sensor values and/or the relative position of the mobile device may identify a current cluster location of the mobile device. It may be determined that the relative location of the mobile device may be with a particular current cluster location of the plurality of cluster locations. In some instances, the cluster location that is closest to the relative position of the mobile device may be identified as the current cluster location. In some instances, rather than identifying a single location cluster, a location vector may be defined. The location vector indicating a location probability for each of the plurality of cluster locations. The location vector for a particular relatives location may be used with a correlation matrix to identify a probability in which a media item will be played on a particular destination device.

At 624, a particular destination device for playing the selected media item may be identified. The particular destination may be identified based on the current cluster location and the stored streaming events. A destination probability may be assigned to each destination device based on the streaming events and the location cluster. The destination probability may be determined by multiplying the location vector by a correlation matrix that specifies a device probability for each of the plurality of destination devices at each of the plurality of cluster locations. In some instances, the destination device with the highest probability may be selected as the particular destination device for playing the selected media item. If the destination probability of the particular destination device exceeds a threshold (e.g., greater than 80%), then the media item may be automatically (e.g., without further user direction) routed to the particular destination device. Otherwise if the destination probability does not exceed the threshold, the user of the mobile device may be prompted to select from one or more destination devices with a sufficiently high destination probability (or the entire list of available destination devices).

Although FIG. 6 illustrated one or more processes described in a particular order, any of the process may be executed any number of times and in any particular order.

VI. Exemplary Devices

Figure 7:
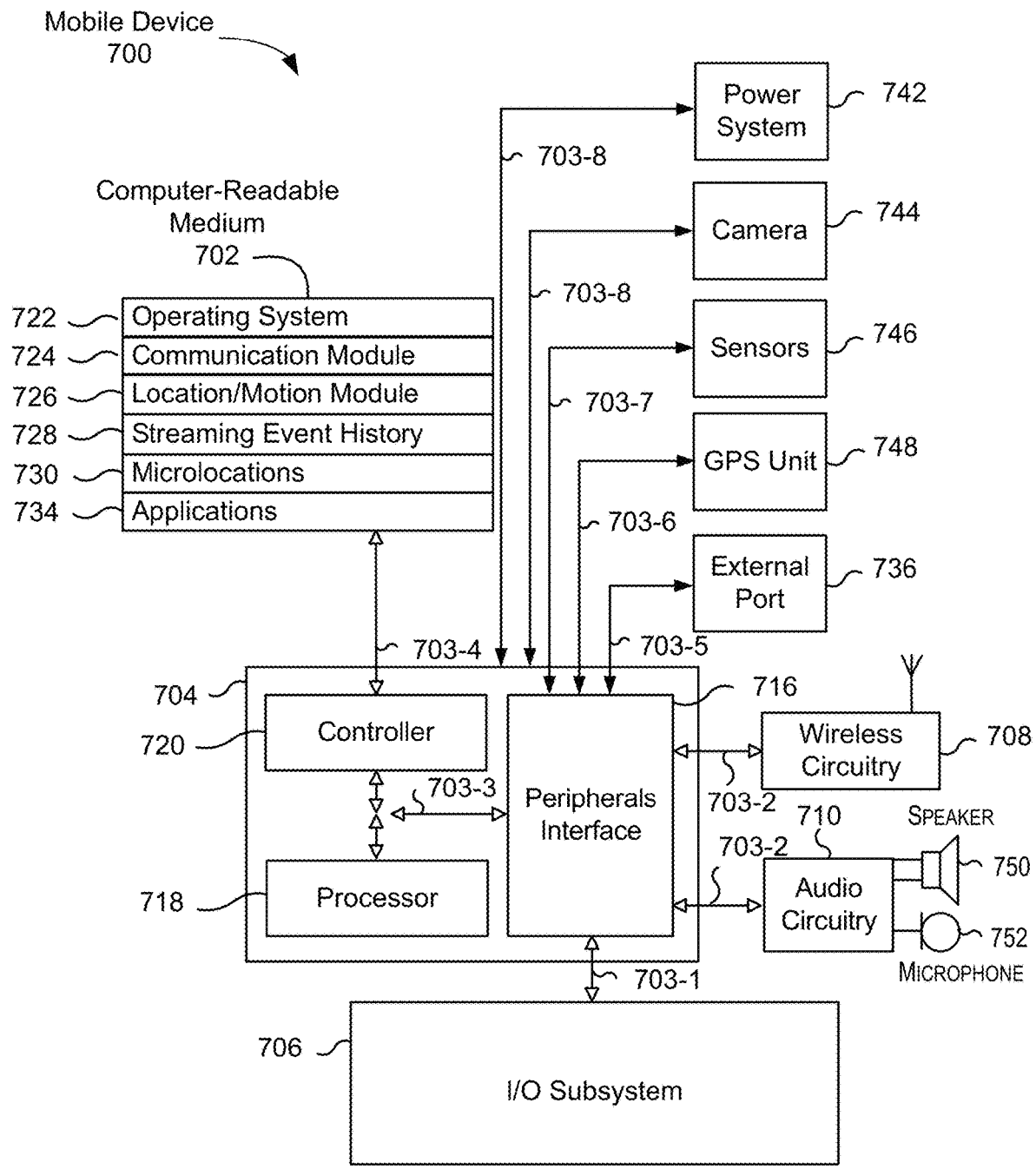
FIG. 7 illustrates a block diagram of an example device according to aspects of the present disclosure.

FIG. 7 is a block diagram of an example device 700, which may be a mobile device. Device 700 generally includes computer-readable medium 702, a processing system 704, an Input/Output (I/O) subsystem 706, wireless circuitry 708, and audio circuitry 710 including speaker 750 and microphone 752. These components may be coupled by one or more communication buses or signal lines 703. Device 700 can be any portable electronic device, including a handheld computer, a tablet computer, a mobile phone, laptop computer, tablet device, media player, personal digital assistant (PDA), a key fob, a car key, an access card, a multi-function device, a mobile phone, a portable gaming device, or the like, including a combination of two or more of these items.

It should be apparent that the architecture shown in FIG. 7 is only one example of an architecture for device 700, and that device 700 can have more or fewer components than shown, or a different configuration of components. The various components shown in FIG. 7 can be implemented in hardware, software, or a combination of both hardware and software, including one or more signal processing and/or application specific integrated circuits.

Wireless circuitry 708 is used to send and receive information over a wireless link or network to one or more other devices' conventional circuitry such as an antenna system, an RF transceiver, one or more amplifiers, a tuner, one or more oscillators, a digital signal processor, a CODEC chipset, memory, etc. Wireless circuitry 708 can use various protocols, e.g., as described herein.

Wireless circuitry 708 is coupled to processing system 704 via peripherals interface 716. Peripherals interface 716 can include conventional components for establishing and maintaining communication between peripherals and processing system 704. Voice and data information received by wireless circuitry 708 (e.g., in speech recognition or voice command applications) is sent to one or more processors 718 via peripherals interface 716. One or more processors 718 are configurable to process various data formats for one or more application programs 734 stored on medium 702.

Peripherals interface 716 couple the input and output peripherals of the device to processor 718 and computer-readable medium 702. One or more processors 718 communicate with computer-readable medium 702 via a controller 720. Computer-readable medium 702 can be any device or medium that can store code and/or data for use by one or more processors 718. Medium 702 can include a memory hierarchy, including cache, main memory and secondary memory.

Device 700 also includes a power system 742 for powering the various hardware components. Power system 742 can include a power management system, one or more power sources (e.g., battery, alternating current (AC)), a recharging system, a power failure detection circuit, a power converter or inverter, a power status indicator (e.g., a light emitting diode (LED)) and any other components typically associated with the generation, management and distribution of power in mobile devices.

In some embodiments, device 700 includes a camera 744. In some embodiments, device 700 includes sensors 746. Sensors can include accelerometers, compass, gyrometer, pressure sensors, audio sensors, light sensors, barometers, and the like. Sensors 746 can be used to sense location aspects, such as auditory or light signatures of a location.

In some embodiments, device 700 can include a GPS receiver, sometimes referred to as a GPS unit 748. A mobile device can use a satellite navigation system, such as the Global Positioning System (GPS), to obtain position information, timing information, altitude, or other navigation information. During operation, the GPS unit can receive signals from GPS satellites orbiting the Earth. The GPS unit analyzes the signals to make a transit time and distance estimation. The GPS unit can determine the current position (current location) of the mobile device. Based on these estimations, the mobile device can determine a location fix, altitude, and/or current speed. A location fix can be geographical coordinates such as latitudinal and longitudinal information.

One or more processors 718 run various software components stored in medium 702 to perform various functions for device 700. In some embodiments, the software components include an operating system 722, a communication module (or set of instructions) 724, a location module (or set of instructions) 726, an streaming event history 728, microlocations 730, and other applications (or set of instructions) 734, such as a car locator app and a navigation app. Microlocations 730 may include instructions to enable a processor 718 to identify a location of the mobile device 700 relative to one or more fixed positions (e.g., signal sources). For example, the wireless circuitry 708 may receive signals from a fixed signal source and a microlocation may be indicate the distance/location of the mobile device relative to the signal source. Microlocations may be stored in memory, such as computer-readable medium 702 and used to define location clusters (e.g., set of microlocations within close spatial proximity to each other). Streaming event history 728 may include instructions for capturing media playback events, media streaming events, etc. including a particular microlocation associated with each event.

Operating system 722 can be any suitable operating system, including iOS, Mac OS, Darwin, RTXC, LINUX, UNIX, OS X, WINDOWS, or an embedded operating system such as VxWorks. The operating system can include various procedures, sets of instructions, software components and/or drivers for controlling and managing general system tasks (e.g., memory management, storage device control, power management, etc.) and facilitates communication between various hardware and software components.

Communication module 724 facilitates communication with other devices over one or more external ports 736 or via wireless circuitry 708 and includes various software components for handling data received from wireless circuitry 708 and/or external port 736. External port 736 (e.g., USB, FireWire, Lightning connector, 60-pin connector, etc.) is adapted for coupling directly to other devices or indirectly over a network (e.g., the Internet, wireless LAN, etc.).

Location/motion module 726 can assist in determining the current position (e.g., coordinates or other geographic location identifier) and motion of device 700. Modern positioning systems include satellite based positioning systems, such as Global Positioning System (GPS), cellular network positioning based on "cell IDs," and Wi-Fi positioning technology based on a Wi-Fi networks. GPS also relies on the visibility of multiple satellites to determine a position estimate, which may not be visible (or have weak signals) indoors or in "urban canyons." In some embodiments, location/motion module 726 receives data from GPS unit 748 and analyzes the signals to determine the current position of the mobile device. In some embodiments, location/motion module 726 can determine a current location using Wi-Fi or cellular location technology. For example, the location of the mobile device can be estimated using knowledge of nearby cell sites and/or Wi-Fi access points with knowledge also of their locations. Information identifying the Wi-Fi or cellular transmitter is received at wireless circuitry 708 and is passed to location/motion module 726. In some embodiments, the location module receives the one or more transmitter IDs. In some embodiments, a sequence of transmitter IDs can be compared with a reference database (e.g., Cell ID database, Wi-Fi reference database) that maps or correlates the transmitter IDs to position coordinates of corresponding transmitters, and computes estimated position coordinates for device 700 based on the position coordinates of the corresponding transmitters. Regardless of the specific location technology used, location/motion module 726 receives information from which a location fix can be derived, interprets that information, and returns location information, such as geographic coordinates, latitude/longitude, or other location fix data.

The one or more applications 734 on the mobile device can include any applications installed on the device 700, including without limitation, a browser, address book, contact list, email, instant messaging, word processing, keyboard emulation, widgets, JAVA-enabled applications, encryption, digital rights management, voice recognition, voice replication, a music player (which plays back recorded music stored in one or more files, such as MP3 or AAC files), etc.

There may be other modules or sets of instructions (not shown), such as a graphics module, a time module, etc. For example, the graphics module can include various conventional software components for rendering, animating and displaying graphical objects (including without limitation text, web pages, icons, digital images, animations and the like) on a display surface. In another example, a timer module can be a software timer. The timer module can also be implemented in hardware. The time module can maintain various timers for any number of events.

The I/O subsystem 706 can be coupled to a display system (not shown), which can be a touch-sensitive display. The display displays visual output to the user in a GUI. The visual output can include text, graphics, video, and any combination thereof. Some or all of the visual output can correspond to user-interface objects. A display can use LED (light emitting diode), LCD (liquid crystal display) technology, or LPD (light emitting polymer display) technology, although other display technologies can be used in other embodiments.

In some embodiments, I/O subsystem 706 can include a display and user input devices such as a keyboard, mouse, and/or track pad. In some embodiments, I/O subsystem 706 can include a touch-sensitive display. A touch-sensitive display can also accept input from the user based on haptic and/or tactile contact. In some embodiments, a touch-sensitive display forms a touch-sensitive surface that accepts user input. The touch-sensitive display/surface (along with any associated modules and/or sets of instructions in medium 702) detects contact (and any movement or release of the contact) on the touch-sensitive display and converts the detected contact into interaction with user-interface objects, such as one or more soft keys, that are displayed on the touch screen when the contact occurs. In some embodiments, a point of contact between the touch-sensitive display and the user corresponds to one or more digits of the user. The user can make contact with the touch-sensitive display using any suitable object or appendage, such as a stylus, pen, finger, and so forth. A touch-sensitive display surface can detect contact and any movement or release thereof using any suitable touch sensitivity technologies, including capacitive, resistive, infrared, and surface acoustic wave technologies, as well as other proximity sensor arrays or other elements for determining one or more points of contact with the touch-sensitive display.

Further, the I/O subsystem can be coupled to one or more other physical control devices (not shown), such as pushbuttons, keys, switches, rocker buttons, dials, slider switches, sticks, LEDs, etc., for controlling or performing various functions, such as power control, speaker volume control, ring tone loudness, keyboard input, scrolling, hold, menu, screen lock, clearing and ending communications and the like. In some embodiments, in addition to the touch screen, device 700 can include a touchpad (not shown) for activating or deactivating particular functions. In some embodiments, the touchpad is a touch-sensitive area of the device that, unlike the touch screen, does not display visual output. The touchpad can be a touch-sensitive surface that is separate from the touch-sensitive display or an extension of the touch-sensitive surface formed by the touch-sensitive display.

In some embodiments, some or all of the operations described herein can be performed using an application executing on the user's device. Circuits, logic modules, processors, and/or other components may be configured to perform various operations described herein. Those skilled in the art will appreciate that, depending on implementation, such configuration can be accomplished through design, setup, interconnection, and/or programming of the particular components and that, again depending on implementation, a configured component might or might not be reconfigurable for a different operation. For example, a programmable processor can be configured by providing suitable executable code; a dedicated logic circuit can be configured by suitably connecting logic gates and other circuit elements; and so on.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission. A suitable non-transitory computer readable medium can include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Computer programs incorporating various features of the present invention may be encoded on various computer readable storage media; suitable media include magnetic disk or tape, optical storage media such as compact disk (CD) or DVD (digital versatile disk), flash memory, and the like. Computer readable storage media encoded with the program code may be packaged with a compatible device or provided separately from other devices. In addition program code may be encoded and transmitted via wired optical, and/or wireless networks conforming to a variety of protocols, including the Internet, thereby allowing distribution, e.g., via Internet download. Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

As described above, one aspect of the present technology is the gathering and use of data available from various sources to improve software application and the software development processes. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used for software energy diagnostics to improve energy consumption of particular software applications. Accordingly, use of such personal information data enables users to improve a particular application used by a user. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of collecting and processing energy consumption reports, the present technology can be configured to allow users to select to "opt in" or "opt out" of participation in the collection of personal information data during registration for services or anytime thereafter. In another example, users can select not to provide mood-associated data for energy consumption reports. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, energy consumption reports may be obtained based on non-personal information data or a bare minimum amount of personal information, such as the content being requested by the device associated with a user, other non-personal information available from other sources, or publicly available information.

Although the invention has been described with respect to specific embodiments, it will be appreciated that the invention is intended to cover all modifications and equivalents within the scope of the following claims.

What is claimed is:

1. A method for routing media data on a first device, the method comprising:
    measuring one or more sensor values at one or more times, the one or more sensor values measured using one or more sensors of the first device, wherein the one or more sensor values are determined from one or more signals emitted by a corresponding one or more signal sources;
    storing media events at the first device, wherein a media event includes a second device of a plurality of second devices that played media and a location of the first device at a time of the media event;
    detecting a selection of a media item;
    measuring one or more current sensor values;
    identifying a current location using the one or more current sensor values;
    identifying a particular second device from the plurality of second devices for playing the selected media item based on the stored streaming events and the current location; and
    routing information to the particular second device for playing the selected media item.

2. The method of claim 1, wherein identifying the particular second device from the plurality of second devices for playing the selected media item is further based on a type of the particular second device.

3. The method of claim 1, wherein identifying the particular second device from the plurality of second devices for playing the selected media item is further based on a current time associated with detecting the selection of the media item.

4. The method of claim 1, wherein identifying the particular second device from the plurality of second devices for playing the selected media item includes:
    determining, for each of the plurality of second devices, a probability that the second device is to be the particular second device based on the stored media events and the current location; and
    selecting, from the plurality of second devices, the particular second device based on the probabilities of the plurality of second devices.

5. The method of claim 4, further comprising:
    providing, to a user, an option to select a different device from the particular second device based on a combined probability of second devices other than the particular second device being greater than a threshold.

6. The method of claim 1, wherein detecting the selection of the media item is performed by the first device based on previous selections of media items.

7. The method of claim 1, further comprising:
    providing an indication of the particular second device to a user.

8. The method of claim 1, wherein the particular second device is the first device.

9. An electronic device comprising:
    one or more processors; and
    a non-transitory computer-readable media including instructions which when executed by the one or more processors, cause the one or more processors to perform operations including:
    measuring one or more sensor values at one or more times, the one or more sensor values measured using one or more sensors of a first device, wherein the one or more sensor values are determined from one or more signals emitted by a corresponding one or more signal sources;
    storing media events at the first device, wherein a media event includes an second device of a plurality of second devices that played media and a location of the first device at a time of the media event;
    detecting a selection of a media item;
    measuring one or more current sensor values;
    identifying a current location using the one or more current sensor values;
    identifying a particular second device from the plurality of second devices for playing the selected media item based on the stored media events and the current location; and
    routing information to the particular second device for playing the selected media item.

10. The electronic device of claim 9, wherein identifying the particular second device from the plurality of second devices for playing the selected media item is further based on a type of the particular second device.

11. The electronic device of claim 9, wherein identifying the particular second device from the plurality of second devices for playing the selected media item is further based on a current time associated with detecting the selection of the media item.

12. The electronic device of claim 9, wherein identifying the particular second device from the plurality of second devices for playing the selected media item includes:
    determining, for each of the plurality of second devices, a probability that the second device is to be the particular second device based on the stored media events and the current location; and selecting, from the plurality of second devices, the particular second device based on the probabilities of the plurality of second devices.

13. The electronic device of claim 12, further comprising: providing, to a user, an option to select a different device from the particular second device based on a combined probability of second devices other than the particular second device being greater than a threshold.

14. The electronic device of claim 9, wherein detecting the selection of the media item is performed by the first device based on previous selections of media items.

15. The electronic device of claim 9, wherein routing the information to the particular second device includes transmitting the selected media item to the particular second device.

16. A non-transitory computer-readable media including instructions which when executed by one or more processors, cause the one or more processors to perform operations including:

measuring one or more sensor values at one or more times, the one or more sensor values measured using one or more sensors of a first device, wherein the one or more sensor values are determined from one or more signals emitted by a corresponding one or more signal sources;

storing media events at the first device, wherein a media event includes an second device of a plurality of second devices that played media and a location of the first device at a time of the media event;

detecting a selection of a media item;

measuring one or more current sensor values;

identifying a current location using the one or more current sensor values;

identifying a particular second device from the plurality of second devices for playing the selected media item based on the stored media events and the current location; and routing information to the particular second device for playing the selected media item.

17. The non-transitory computer-readable media of claim 16, wherein identifying the particular second device from the plurality of second devices for playing the selected media item is further based on a type of the particular second device.

18. The non-transitory computer-readable media of claim 16, wherein identifying the particular second device from the plurality of second devices for playing the selected media item is further based on a current time associated with detecting the selection of the media item.

19. The non-transitory computer-readable media of claim 16, wherein identifying the particular second device from the plurality of second devices for playing the selected media item includes:

determining, for each of the plurality of second devices, a probability that the second device is to be the particular second device based on the stored media events and the current location; and selecting, from the plurality of second devices, the particular second device based on the probabilities of the plurality of second devices.

20. The non-transitory computer-readable media of claim 19, further comprising:

providing, to a user, an option to select a different device from the particular second device based on a combined probability of second devices other than the particular second device being greater than a threshold.

* * * * *

UNITED STATES PATENT AND TRADEMARK OFFICE
CERTIFICATE OF CORRECTION

PATENT NO. : 11,490,316 B2
APPLICATION NO. : 17/180558
DATED : November 1, 2022
INVENTOR(S) : Alexander D. Palmer et al.

It is certified that error appears in the above-identified patent and that said Letters Patent is hereby corrected as shown below:

In the Claims

Column 23, Claim 1, Line 58, delete "the stored streaming events" and insert --the stored media events--

Signed and Sealed this
Seventh Day of March, 2023

Katherine Kelly Vidal
*Director of the United States Patent and Trademark Office*